(12) United States Patent
Vasantham et al.

(10) Patent No.: US 9,489,425 B2
(45) Date of Patent: Nov. 8, 2016

(54) ROUTING ORDER LOOKUPS

(71) Applicant: Wal-Mart Stores, Inc., Bentonville, AR (US)

(72) Inventors: Madhavan Kandhadai Vasantham, Foster City, CA (US); Mahesh Tyagarajan, San Jose, CA (US); Sreekanth Sreedhararaj, Foster City, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 131 days.

(21) Appl. No.: 14/230,717

(22) Filed: Mar. 31, 2014

(65) Prior Publication Data
US 2015/0278308 A1  Oct. 1, 2015

(51) Int. Cl.
G06F 7/00 (2006.01)
G06F 17/00 (2006.01)
G06F 17/30 (2006.01)

(52) U.S. Cl.
CPC .................. G06F 17/3048 (2013.01)

(58) Field of Classification Search
CPC .......... G06F 17/30575; G06F 17/30174; G06F 17/30581; G06F 17/30864; H04L 67/1095
USPC ......................................... 707/610
See application file for complete search history.

(56) References Cited

U.S. PATENT DOCUMENTS

| | | | |
|---|---|---|---|
| 7,698,170 B1 * | 4/2010 | Darr | G06Q 30/0609 705/26.35 |
| 8,495,487 B2 * | 7/2013 | Jerome | G06Q 40/00 707/602 |
| 2002/0007321 A1 * | 1/2002 | Burton | G06Q 10/087 705/51 |
| 2002/0055878 A1 * | 5/2002 | Burton | G06Q 30/06 705/27.2 |
| 2004/0015386 A1 * | 1/2004 | Abe | G06Q 10/06375 705/7.29 |
| 2004/0019494 A1 * | 1/2004 | Ridgeway | G06Q 10/0637 705/26.1 |
| 2006/0011720 A1 * | 1/2006 | Call | A61L 2/10 235/383 |
| 2006/0212361 A1 * | 9/2006 | Perkowski | G06F 17/30879 705/26.62 |
| 2006/0250248 A1 * | 11/2006 | Tu | G06Q 10/06 340/572.4 |
| 2007/0233580 A1 * | 10/2007 | Pike | G06Q 30/0603 705/27.1 |
| 2007/0260591 A1 * | 11/2007 | Ahi | G06Q 10/109 |
| 2008/0294996 A1 * | 11/2008 | Hunt | G06Q 30/02 715/739 |
| 2009/0019003 A1 * | 1/2009 | Bohannon | G06Q 30/02 |

(Continued)

*Primary Examiner* — Syed Hasan
*Assistant Examiner* — Nicholas Allen
(74) *Attorney, Agent, or Firm* — Bryan Cave LLP

(57) ABSTRACT

The present invention is generally directed to methods, systems, and computer program products for routing order lookups. Order data from order management system database is synchronized to an order cache. When an order lookup is received, a business layer determines if the cache can appropriately service the order lookup. If so, the business layer routes the order lookup to the cache. Otherwise, the business layer routes the order lookup to the order management system database. In some embodiments, order lookups configured to impact state of the order management system database (e.g., that write or change order data) are routed to the order management system database. In these same embodiments, order lookups configured to not impact state of the order management system database (e.g., that read order data) are routed to the cache.

20 Claims, 7 Drawing Sheets

(56) References Cited

U.S. PATENT DOCUMENTS

| | | | |
|---|---|---|---|
| 2009/0031232 A1* | 1/2009 | Brezina | H04M 15/00 715/764 |
| 2009/0198536 A1* | 8/2009 | Hamilton, II | G06Q 30/0239 705/37 |
| 2009/0254337 A1* | 10/2009 | Sprecher | G06F 17/271 704/9 |
| 2009/0276449 A1* | 11/2009 | Syed | G06F 17/30442 |
| 2012/0089700 A1* | 4/2012 | Safruti | H04L 67/2842 709/217 |
| 2012/0226595 A1* | 9/2012 | Torres | G06Q 40/06 705/37 |
| 2012/0226612 A1* | 9/2012 | Kurtis | G06Q 40/00 705/44 |
| 2012/0265671 A1* | 10/2012 | Higgins | G06F 21/335 705/39 |
| 2012/0278242 A1* | 11/2012 | Griffith | G06Q 30/02 705/304 |
| 2013/0085984 A1* | 4/2013 | Burger | G06F 17/30471 707/609 |
| 2013/0151381 A1* | 6/2013 | Klein | G06Q 30/0641 705/27.1 |
| 2013/0151491 A1* | 6/2013 | Gislason | G06F 17/30339 707/696 |
| 2013/0173402 A1* | 7/2013 | Young | G06Q 30/0631 705/14.73 |
| 2013/0204697 A1* | 8/2013 | Boal | G06Q 30/0207 705/14.51 |
| 2013/0211967 A1* | 8/2013 | Ogilvy | G06Q 20/12 705/26.82 |
| 2013/0222116 A1* | 8/2013 | Barry, III | G06Q 50/22 340/10.1 |
| 2013/0282466 A1* | 10/2013 | Hampton | G06Q 30/0633 705/14.27 |
| 2013/0290234 A1* | 10/2013 | Harris | G06N 5/022 706/46 |
| 2013/0297458 A1* | 11/2013 | Van de Capelle | G06Q 30/0655 705/26.81 |
| 2013/0311315 A1* | 11/2013 | Zises | G06Q 30/0605 705/26.2 |
| 2013/0318152 A1* | 11/2013 | Iyer | G06F 9/541 709/203 |
| 2013/0332488 A1* | 12/2013 | Christy | G06Q 30/01 707/781 |
| 2013/0346380 A1* | 12/2013 | Dong | G06F 17/30545 707/705 |
| 2014/0052750 A1* | 2/2014 | Ciabrini | G06F 17/3048 707/769 |

\* cited by examiner

ROUTING ORDER LOOKUPS

CROSS-REFERENCE TO RELATED APPLICATIONS

Not Applicable.

BACKGROUND

1. Field of the Invention

This invention relates generally to the field of looking up database data, and, more particularly, to methods, systems, and computer program products for routing order lookups for order data.

2. Related Art

Retailers often maintain an order database of customer orders. When a customer orders or purchases one or more products, a corresponding order record can be created and stored in the order database. Customer orders can include various different types of order data, such as, for example, an order number, date/time of order, list of items purchased, cost of items purchased, quantity of items purchases, shipping method, a customer number, order status (e.g., pending, processed, shipped, etc.). Looking up their current and past orders is very important to customers. Thus, retailers typically allow customer access to an order database so that customers can view information about their orders. For example, through a website or mobile application a customer can query an order database for information about their orders. The order database can receive a query, identify one or more orders satisfying the query, and return the identified one or more orders to the client.

For some retailers, customer order database queries place a significant burden on order database resources. The resources consumed responding to customer queries can result in slower response to times for all customers. Slower response times can having a negative impact on the buying experience and, if response times are to slow, may cause a retailer to lose customers. That is, if response times are to slow, a prospective customer may be become impatient and/or frustrated and look for items elsewhere.

When buying online (e.g., through electronic commerce, mobile commerce, and social commerce environments), customers typical interact with a retailer through a graphical user interface (e.g., a website). The graphical user interface (can sit on top of, for example, a product database and) allows customers to browse and order items. When an order process is complete, a retailer can provide an order link for an order to the customer. The order link can then be selected to access order data corresponding to the order.

Thus, upon completion of an order, some customers may immediately and repeatedly start selecting the order link (e.g., clicking with a mouse) until order data is returned. Each time the order link is selected, a new query can be issued to the database for corresponding order data. The frequency of selecting the link may be much faster than the order database can respond. As such, multiple redundant queries can be issued for the same order data. The order database processes the redundant queries and returns multiple copies of the order data. Since many of the queries are redundant, order database resources are unnecessarily consumed.

Redundant queries can further deplete available order database resources, making it even more difficult to provide reasonable response times to all customers.

BRIEF DESCRIPTION OF THE DRAWINGS

The specific features, aspects and advantages of the present invention will become better understood with regard to the following description and accompanying drawings where.

DETAILED DESCRIPTION

Figure 1:
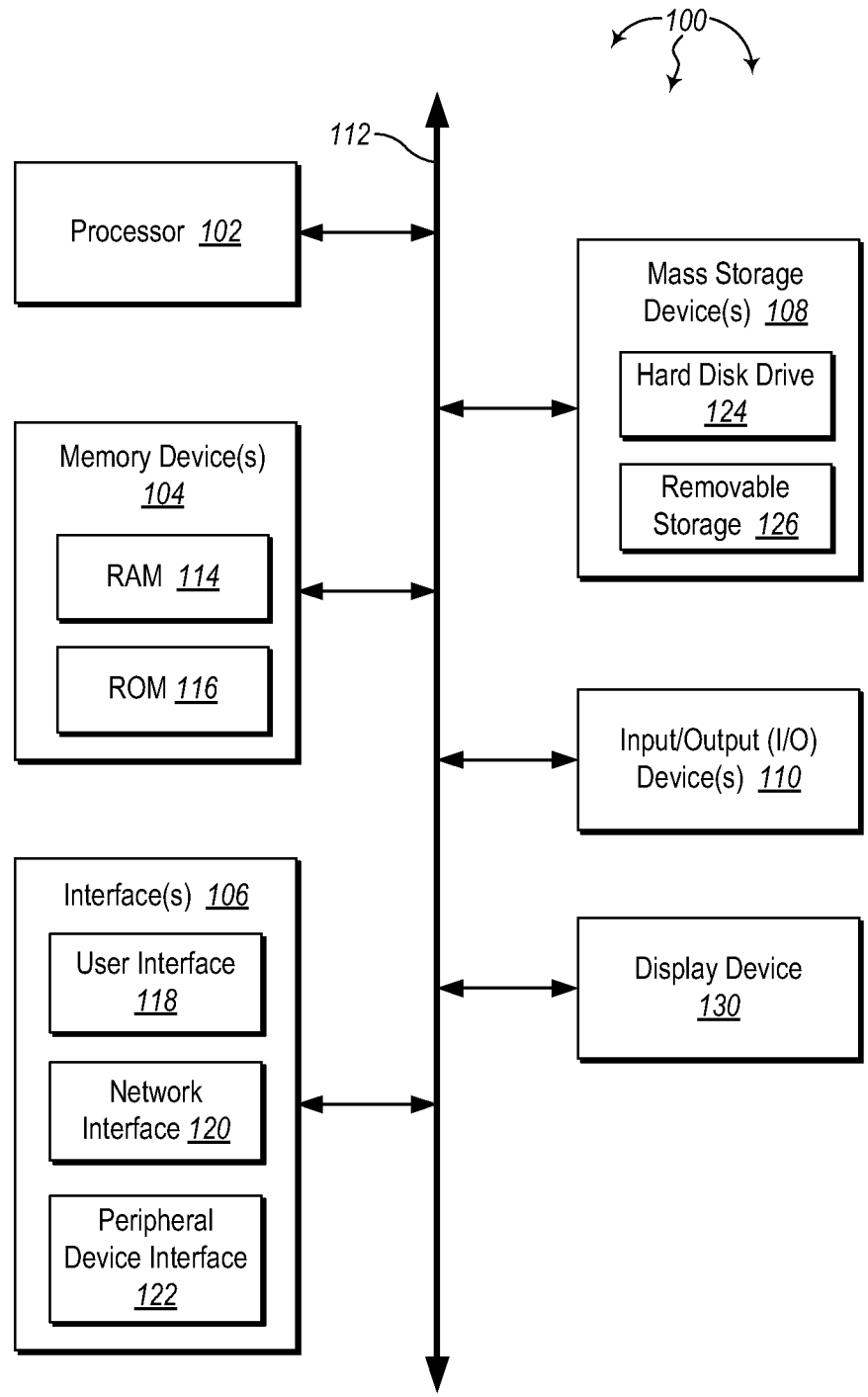
FIG. 1 illustrates an example block diagram of a computing device.

The present invention extends to methods, systems, and computer program products for routing order lookups.

In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, kiosks, Point-Of-Sale ("POS") terminals, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

The present invention is generally directed to routing order lookups. Embodiments of the invention facilitate more efficient order lookups of order detail data from an order management system database. Order data from order management system database is synchronized to an order cache. In some embodiments, the order management system database feeds the order cache with the latest updates on orders as relevant state for orders changes. The order cache can store order objects in and attribute-value pair (e.g., a JavaScript Object Notation ("JSON") format.

When an order lookup is received, a business layer determines if the cache can appropriately service the order lookup. If so, the business layer routes the order lookup to the cache. Otherwise, the business layer routes the order lookup to the order management system database. In some embodiments, order lookups configured to impact state of the order management system database (e.g., that write or change order data) are routed to the order management system database. In these same embodiments, order lookups configured to not impact state of the order management system database (e.g., that read order data) are routed to the cache.

Many different types of order lookups do not impact state. Routing these types of order lookups to the order cache reduces resource consumption at the order management system database. In turn, resources are freed up so that order lookups having a state impact can be more efficiently serviced at the order management system database. Routing order lookups that do not impact state to the cache (as opposed to the order management system database) also facilitates more efficient servicing of these order lookups.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
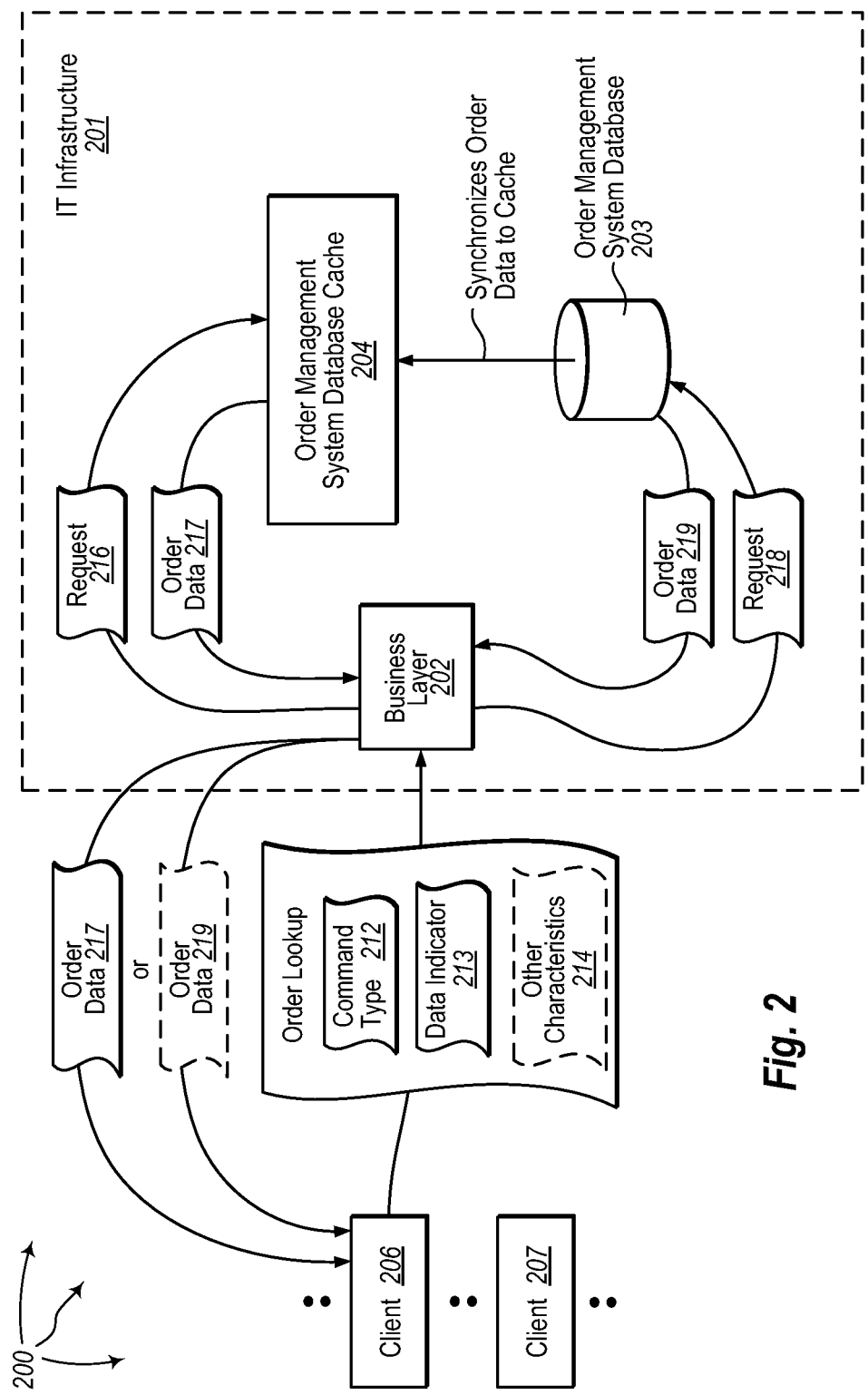
FIG. 2 illustrates an example computer architecture that facilitates routing order lookups.

FIG. 2 illustrates an example computer architecture 200 that facilitates routing order lookup requests. As depicted, computer architecture 200 includes Information Technology ("IT") infrastructure 201, client 206, and client 207 (the vertical ellipses before, between, and after clients 206 and 207 indicate that other clients may exist). IT infrastructure 201, client 206 and client 207 can be connected to (or be part of) a network, such as, for example, a PAN, a LAN, a WAN, and even the Internet. IT infrastructure 201, client 206 and client 207 can also be connected to a variety of other systems over the network. Accordingly, IT infrastructure 201, client 206 and client 207, as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

IT infrastructure 201 can be associated with (and potentially owned by) a retail business entity. As such, IT infrastructure 201 can be connected to or include a Point-Of-Sale ("POS") system for the retail business entity. IT infrastructure 201 can also be connected to or include one or more of electronic commerce (e-commerce), mobile commerce (m-commerce), and social commerce modules for the retail business entity. Using a POS system or commerce module, a customer can perform a variety of retail related operations, including purchase items, order items, return items, track orders, track items, access order details, update order details, etc.

As depicted, IT infrastructure 201 further includes business layer 202, order management system database 203, and order management system database cache 204. Order management system ("OMS") database 203 can store order details for customer orders. From time to time, at specified intervals, or in response to designated triggers, OMS database 203 can synchronize order data to OMS database cache 204. As such, OMS database cache 204 can also store order details for customer orders. An order detail for an order can include, for example, one or more of: an order number, date/time of order, list of items purchased, cost of items purchased, quantity of items purchased, shipping method, tracking number, customer number, and order status. Order status can be, for example, order created, order in process, order being fulfilling, order shipped, order delivered, order return created, order return received and order return processed.

OMS database 203 and OMS database cache 204 can store order details in different formats. For example, OMS database 203 can store order details in a relational database management system ("RDBMS") format and OMS database cache 204 can store order details in other formats based on attribute-value pairs. These other formats include JavaScript Object Notation ("JSON") and eXstensible Markup Language ("XML"). Thus, synchronizing order details from OMS database 203 to OMS database cache 204 can include converting order details from an RDBMS format to a format based on attribute-value pairs. Use of attribute-value pair formats helps ensure that order lookups entered through a website or mobile application are efficiently serviced.

Business layer 202 is configured to route order lookups to an appropriate data source to service the order lookups. In some embodiments, business layer 202 can route order lookups that change order state to OMS database 203 and can route order lookups that do not change order state to OMS database cache 204. For example, an order lookup requesting a change to the quantity of a purchased item can be routed to OMS database 203. On the other hand, an order lookup requesting order numbers for all orders in the last three months can be routed to OMS database cache 204. Business layer 202 can also consider other characteristics, such as, for example, whether an order detail has yet been synchronized, time since order creation, etc., when routing order lookups.

Clients, such as, for example, clients 206, 207, etc. can send order lookups to IT infrastructure 201. Clients can send order lookups through any of a variety of different channels including a POS terminal, an in-store kiosk, e-commerce, m-commerce, social commerce, etc. Order lookups can be sent from clients on the behalf of a customer (of the retail business entity). An order lookup can also be sent by a customer on their own behalf. For example, a customer can login to a website or mobile application of the retail business entity. The customer can then submit an order lookup through appropriate (e.g., graphical user) interfaces. Alternately, an employee or agent of the retail business entity, for example, in a physical store location or through customer service, can submit an order lookup on behalf of a customer. For example, an in store employee can submit an order lookup for a customer through a POS terminal.

An order lookup sent from a client may or may not request a change to the state of OMS database 203. As described, business layer 202 can receive an order lookup and route the order lookup to an appropriate data source to service the order lookup. Indicated order data responsive to an order lookup can be identified at and gathered from the appropriate data source. Subsequently, in response to the order lookup, IT infrastructure 201 can return the indicated order data. For example, if a customer requests a list of their orders having a purchase price over $100, IT infrastructure 201 can return a list of order numbers for orders having a purchase price over $100. If customer requests that an order be canceled, IT infrastructure 201 can return an indication that the order has been canceled.

Figure 3:
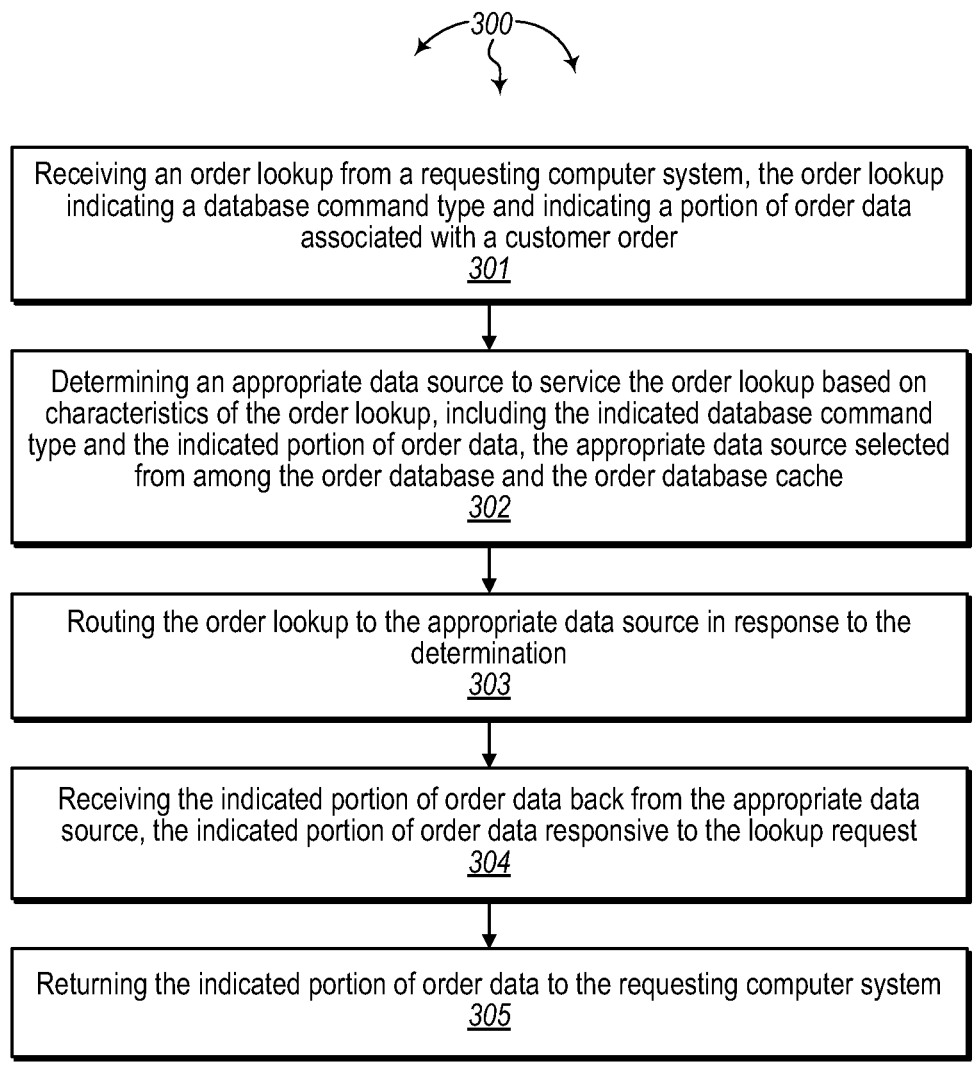
FIG. 3 illustrates a flow chart of an example method for routing order lookups.

FIG. 3 illustrates a flow chart of an example method 300 routing order lookups. Method 300 will be described with respect to the components and data of computer architecture 200.

Method 300 includes receiving an order lookup from a requesting computer system, the order lookup indicating a database command type and indicating a portion of order data associated with a customer order (301). For example, IT infrastructure 201 can receive order lookup 211 from client 206. Order lookup 211 includes command type 212 and data indicator 213. Order lookup 211 can also include other characteristics 214. A user of client 206 (e.g., a customer or employee or agent of the retail business entity) can send order lookup 211 to IT infrastructure 201.

In general, command type 212 can indicate a command that either does impact the state of OMS database 203 or does not impact the state of OMS database 203. Commands that do impact the state of OMS database 203 include but are not limited to commands that create an order, commands that cancel an order, or commands that add, delete, or change values in order data (e.g., item quantities, a shipping addresses, etc.) Commands that do not impact of the state of OMS database 203 include but are not limited to commands that read order data.

Data indicator 213 indicates portions of one or more order details that are of interest to the customer, such as, for example, order number(s), date/time of order(s), list(s) of items purchased, cost(s) of items purchased, item(s) quantity, shipping method(s), tracking number(s), customer number, and order(s) status. Order status can be, for example, order created, order in process, order being fulfilling, order shipped, order delivered, order return created, order return received and order return processed.

Other characteristics 214 can indicate other characteristics of order lookup 211, such as, for example, a time stamp indicating order lookup 211 was issued.

Method 300 includes determining an appropriate data source to service the order lookup based on characteristics of the order lookup, including the indicated database command type and the indicated portion of order data, the appropriate data source selected from among the order database and the order database cache (302). For example, business layer 202 can determine if OMS database 203 or OMS database cache 204 is the appropriate data source to service order lookup 211. Business layer 211 can determine the appropriate data source from command type 212, and data indicator 213 (and when appropriate other characteristics 214). For example, if command type 212 indicates a command that is configured to impact state, business layer 211 can determine that OMS database 203 is the appropriate data source to service order lookup 211. On the other hand, if command type 212 indicates a command that is configured to not impact state, business layer 211 can determine that OMS database cache 204 is the appropriate data source to service order lookup 211.

When order data indicated by data indicator 213 has not yet been synchronized to database cache 204 (or for other reasons), business layer 202 can determine that OMS database 203 is the appropriate data source to service order lookup 211 (even when command type 212 indicates a command that is configured to not impact state). Business layer 202 can consider other characteristics 214, such as, for example, a time stamp, and/or other timing related data when determining if and when indicated data has or has not been synchronized from synchronized to for OMS database 203 to OMS database cache 204.

Business layer 202 can process order request 211 to formulate a corresponding request in a format compatible with the determined appropriate data source. For example, if OMS database 203 is the determined data source, business layer 202 can formulate request 218 (e.g., an RDBMS query) from order request 211. On the other hand, if OMS database cache 204 is the determined data source, business layer 202 can formulate request 216 (e.g., a request for JSON data) from order request 211.

Method 300 includes routing the order lookup to the appropriate data source in response to the determination (303). For example, when the appropriate data source is OMS database cache 204, business layer 202 can route request 216 to OMS database cache 204. On the other hand, when the appropriate data source is OMS database 203, business layer 202 can route request 218 to OMS database 203.

Method 300 includes receiving the indicated portion of order data back from the appropriate data source, the indicated portion of order data responsive to the lookup request (304). For example, OMS database cache 204 can return order data 217 to business layer 202 in response to request 216. Order data 217 can include of the described order data for one or more order details. Alternately, OMS database 203 can return order data 219 to business layer 202 in response to request 218. Order data 219 can include the described order data for one or more order details.

Method 300 includes returning the indicated portion of order data to the requesting computer system (305). For example, IT infrastructure can return order data 217 or order 219 to client 206 in response to order lookup 211 as appropriate.

In some embodiments, the functionality of business layer 202 is provided in a client. Thus, the client can determine to route an order lookup to an OMS database or a corresponding OMS data cache.

Figure 4:
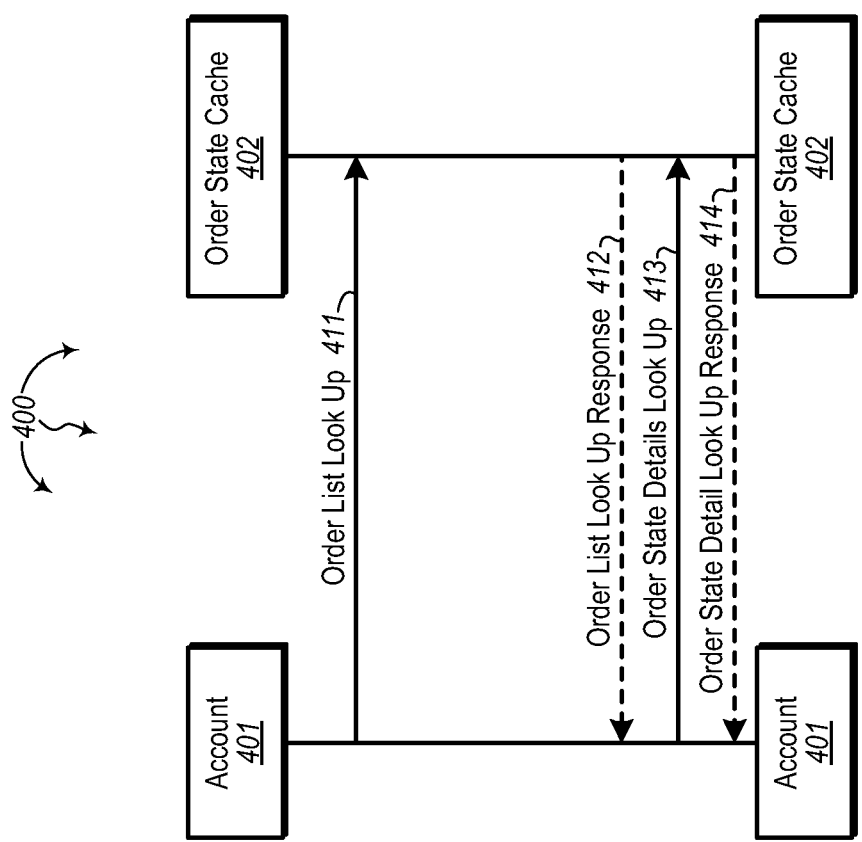
FIG. 4 illustrates a sequence diagram of an example for processing related order lookups.

FIG. 4 illustrates a sequence diagram 400 of an example for processing related order lookups. A customer can log into account 401 via a communication channel, such as, for example, website, mobile, etc. From account 401, the customer can route order list lookup 411 to order state cache 402. Order state cache 402 (which is similar to OMS database cache 204) can return order list lookup response 412, for example, a list of order numbers, back to account 401. As described, order detail for an order can be stored as JSON formatted data. Thus, the list of order numbers can be retrieved from within JSON formatted data for a corresponding plurality of orders stored in order state cache 402. For each order, an order number can be accessed from corresponding JSON data without having to return the entire order detail.

The customer can review the list of order numbers through (e.g., a graphical user) interface of account 401. The customer can request additional order detail for a subset of one or more orders identified in the list order numbers. The customer can select a corresponding subset of one or more order numbers form the list of order numbers. From account 401, the customer can route order state details lookup 413 to order state cache 402. Order state details lookup 413 can request further order detail data for the selected subset of one or more orders. Order state cache 402 can return order state detail lookup response 414 to account 401. Order state detail lookup response 414 can include the requested additional order detail (e.g., other JSON formatted data) for the subset of one or more orders.

Figure 5:
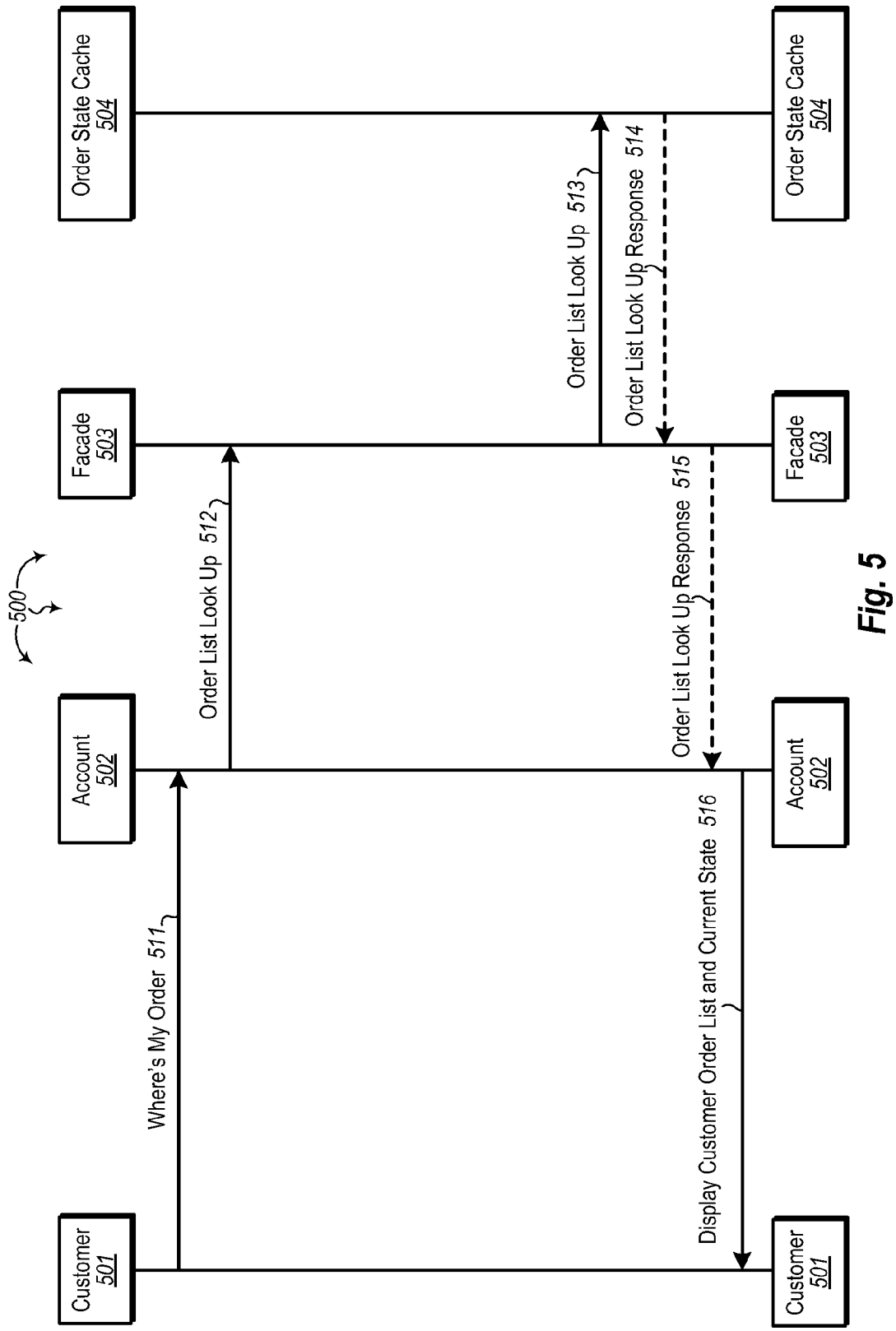
FIG. 5 illustrates a sequence diagram of an example for processing an order lookup.

FIG. 5 illustrates a sequence diagram 500 of an example for processing an order lookup. In some embodiments, sequence diagram 500 is implemented shortly after a customer enters an order. Customer 501 can log into account 502 via a communication channel, such as, for example, website, mobile, etc. Customer 502 can indicate a desire for order information (e.g., where's my order request 511) through account 502. In response, account 502 can send order list lookup 512 to façade 503 (which is similar to business layer 202). Façade 503 can determine that order list lookup 512 is not configured to impact state. For example, order list lookup 512 can be a request for the status of an order recently entered by customer 501. Façade 503 can route corresponding order list lookup 513 to order state cache 504 (which is similar to OMS database cache 204). Thus, façade 503 acts as a proxy to route an order lookup request 513 to order state cache 504 (as opposed to a corresponding OMS database).

Order state cache 504 can return order list lookup response 514 to façade 503. Order list lookup response 514 can include the order status of customer 501's recently entered order. In response, façade 503 can send corresponding order list lookup response 515 (also including the order status of customer 501's recently entered order) to account 502. Account 502 can indicate the status of the recently entered order to customer 501 at a (e.g., graphical user) interface (e.g., display customer order list and current state 516).

Figure 6:
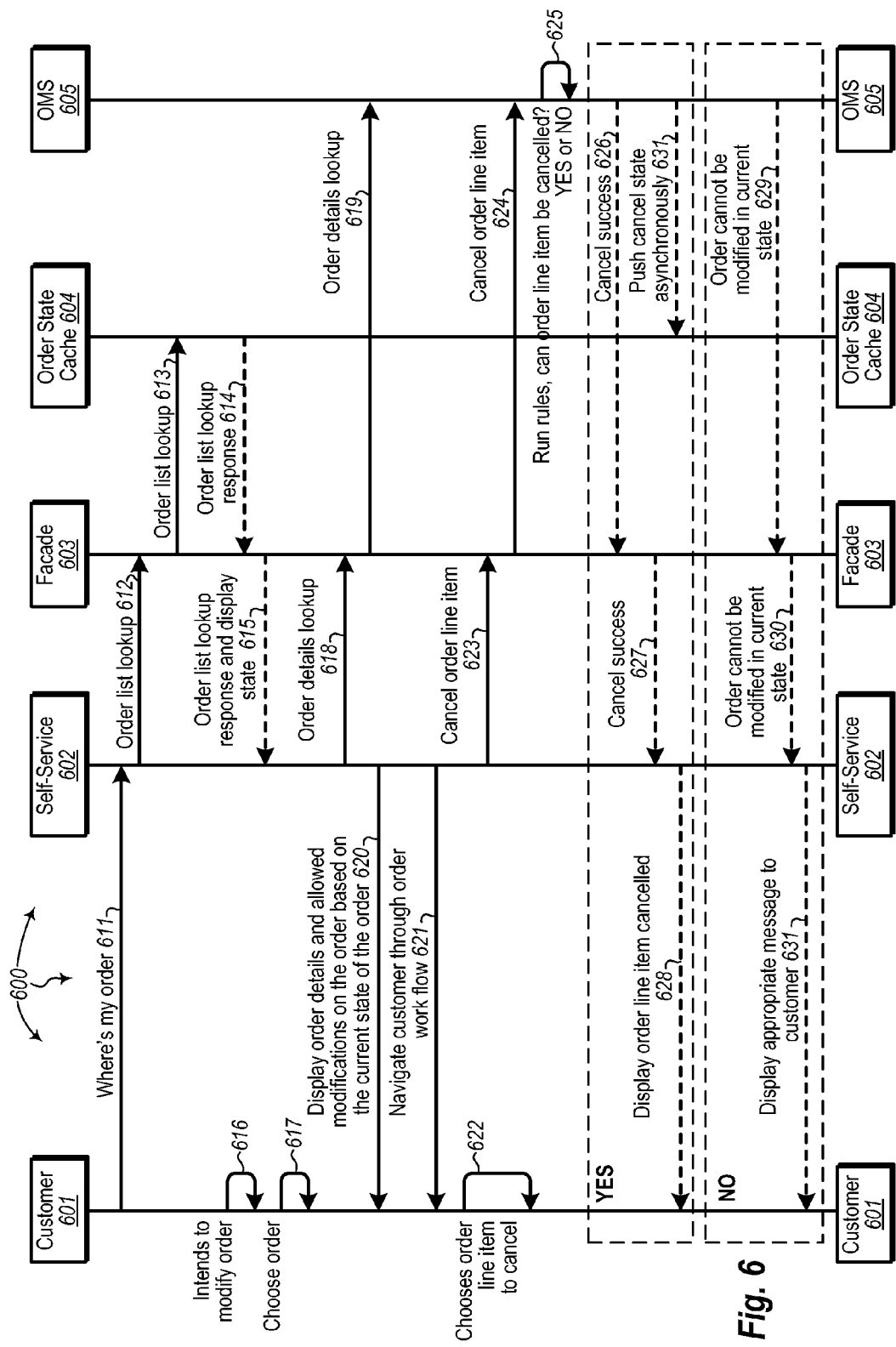
FIG. 6 illustrates a sequence diagram of an example for processing an order line item cancelation.

FIG. 6 illustrates a sequence diagram 600 of an example for processing an order line item cancelation. Customer 601 can log into self-service 602 via a communication channel, such as, for example, website, mobile, etc. Customer 601 can indicate a desire for order information (e.g., where's my order request 611) through self-service 602. In response, self-service 602 can send order list lookup 612 to façade 603 (which is similar to business layer 202). Façade 603 can determine that order list lookup 612 is not configured to impact state. Façade 603 can route corresponding order list lookup 613 to order state cache 604 (which is similar to OMS database cache 204). Thus, façade 603 acts as a proxy to route an order lookup request to order state cache 604 (as opposed to a corresponding OMS database).

Order state cache 604 can return order list lookup response 614 to façade 603. Order list lookup response 614 can include the order status of one of customer 601's orders. In response, façade 603 can send corresponding order list lookup response 615 (also including the order status of customer 601's order) to self-service 602. Customer 601 can indicate an intent to modify an order and choose the order (e.g., intends to modify order 616 and choose order 617).

In response, self-service 602 can send order details lookup 618 to façade 603. Since order details lookup 618 is associated with an intent to modify an order (and thus change state), façade 603 routes corresponding order details lookup 619 to OMS 605 (which is similar to OMS database 203). Self-service 602 can display order details and allowed modifications on the order based on the current state of the order 620 to customer 601. Self-service 602 can also navigate customer 601 through an order modification flow. Customer 601 can choose an order line item to cancel 622. In response, self-service 602 can send cancel order line item 623 to façade 603. Since cancel order line item 623 is associated with an intent to cancel a line item (and thus change state), façade 603 routes corresponding cancel order line item 624 to OMS 605.

OMS 605 runs rules to determine if the line item can be canceled 625. If rules indicate that the line item can be canceled, OMS 605 sends cancel success 626 to façade 603. Façade 603 in turn indicates can cancel success 627 to self-service 602. Self-service 602 then displays the order line item as canceled 628. When the order line item is successfully canceled, OMS 605 can also synchronize the order line item cancelation with order state cache 604. For example, OMS 605 can push cancel state 631 asynchronously to order state cache 604.

If rules indicate that the line item cannot be canceled, OMS 605 returns order cannot be modified in current state 629 to façade 603. In turn, façade 603 returns order cannot be modified in current state 630 to self-service 602. Self-service 602 displays an appropriate message 631 to customer 601.

Figure 7:
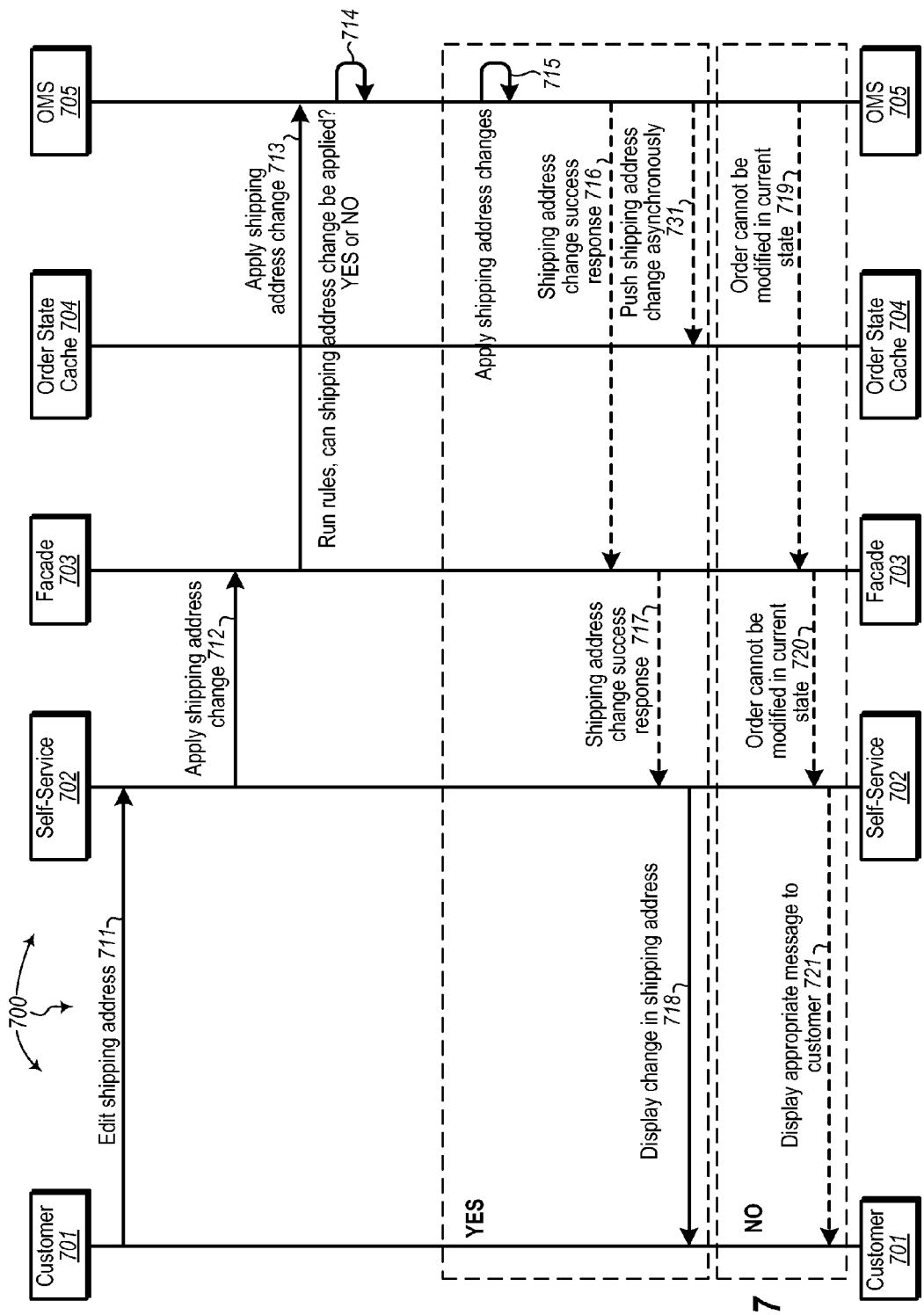
FIG. 7 illustrates a sequence diagram of an example for processing a shipping address change.

FIG. 7 illustrates a sequence diagram of an example for processing a shipping address change. Customer 701 can enter edit shipping address 711 to self-service 702. Self-service 702 can send apply shipping address change 712 to façade 703 (which is similar to business layer 202). Since apply shipping address change 712 is associated with an intent to modify an order (and thus change state), façade 703 routes corresponding apply shipping address change 713 to OMS 705 (which is similar to OMS database cache 204). OMS 705 implements rules 714 to determine if the shipping address change can be applied.

If rules indicate that the shipping address can be changed, OMS 705 applies the shipping address change 715. OMS 705 sends shipping address change success response 716 to façade 703. In turn, façade 703 sends shipping address change success response 717 to self-service 702. Self-service 702 displays the change in shipping address 718 to customer 701. When the shipping address is successfully changed, OMS 705 can also synchronize the shipping address change with order state cache 704. For example, OMS 705 can push shipping address change 731 asynchronously to order state cache 704

If rules indicate that the shipping address cannot be changed, OMS 705 returns order cannot be modified in current state 719 to façade 703. In turn, façade 703 returns order cannot be modified in current state 720 to self-service 702. Self-service 702 displays an appropriate message 721 to customer 701.

Other calls can also be made to recompute LOS, shipping, inventory, price, taxes, etc.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. At a computer system, the computer system comprising one or more processors and system memory, the computer system communicatively coupled to an order database for a retailer and to an order database cache, the order database comprising order data for a plurality of customer orders, the order database cache comprising the order data synchronized from the order database, a method for routing an order lookup, the method comprising:
   synchronizing the order data from the order database to the order database cache by converting the order data from a relational database management system to a format based on attribute-value pairs;
   receiving the order lookup from a requesting computer system, the order lookup indicating a database command type and indicating a portion of the order data associated with a customer order of the plurality of customer orders;
   a processor determining an appropriate data source to service the order lookup based on characteristics of the order lookup, the characteristics comprising the database command type indicated and the portion of the order data indicated, the appropriate data source selected from among the order database and the order database cache;
   routing the order lookup to the appropriate data source in response to the determination;
   receiving the portion of the order data indicated back from the appropriate data source, the portion of the order data indicated responsive to the order lookup from the requesting computer system; and
   returning the portion of the order data indicated to the requesting computer system.

2. The method of claim 1, wherein:
   receiving the order lookup from the requesting computer system comprises receiving an order lookup request that is configured to not change state at the order database.

3. The method of claim 2, wherein:
   determining the appropriate data source to service the order lookup based on the characteristics of the order lookup comprises determining that the order database cache is the appropriate data source to service the order lookup.

4. The method of claim 2, wherein:
   routing the order lookup to the appropriate data source comprises routing the order lookup to the order database cache.

5. The method of claim 1, wherein:
   receiving the order lookup from the requesting computer system comprises receiving an order lookup request that is configured to change state at the order database.

6. The method of claim 5, wherein:
   determining the appropriate data source to service the order lookup based on the characteristics of the order lookup comprises determining that the order database is the appropriate data source to service the order lookup.

7. The method of claim 5, wherein:
   routing the order lookup to the appropriate data source comprises routing the order lookup to the order database.

8. The method of claim 1, wherein:
   receiving the portion of the order data indicated back from the appropriate data source comprises receiving back a list of order numbers; and
   returning the portion of the order data indicated to the requesting computer system comprises returning the list of order numbers to the requesting computer system.

9. The method of claim 8, further comprising:
   receiving an other order lookup from the requesting computer system, the other order lookup requesting additional order detail for an order of the plurality of customer orders, the order of the plurality of customer orders corresponding to an order number in the list of order numbers.

10. The method of claim 9, further comprising:
    the processor determining another appropriate data source to service the other order lookup based on characteristics of the other order lookup.

11. A computer program product for use at a computer system, the computer system communicatively coupled to an order database for a retailer and to an order database cache, the order database comprising order data for a plurality of customer orders, the order database cache containing the order data synchronized from the order database, the computer program product for implementing a method for routing an order lookup, the computer program product comprising one or more non-transitory computer storage devices having stored thereon computer-executable instructions that, when executed at a processor, cause the computer system to perform the method, the method comprising:
   synchronizing the order data from the order database to the order database cache by converting the order data from a relational database management system to a format based on attribute-value pairs;
   receiving the order lookup from a requesting computer system, the order lookup indicating a database command type and indicating a portion of the order data associated with a customer order of the plurality of customer orders;
   determining an appropriate data source to service the order lookup based on characteristics of the order lookup, the characteristics comprising the database command type indicated and the portion of the order data indicated, the appropriate data source selected from among the order database and the order database cache;
   routing the order lookup to the appropriate data source in response to the determination;
   receiving the portion of the order data indicated back from the appropriate data source, the portion of the order data indicated responsive to the order lookup; and
   returning the portion of the order data indicated to the requesting computer system.

12. The computer program product of claim 11, wherein:
receiving the order lookup from the requesting computer system comprises receiving an order lookup request configured to not change state at the order database;
determining the appropriate data source to service the order lookup based on the characteristics of the order lookup comprises determining that the order database cache is the appropriate data source to service the order lookup; and
routing the order lookup to the appropriate data source comprises routing the order lookup to the order database cache.

13. The computer program product of claim 12, wherein:
receiving the portion of the order data indicated back from the appropriate data source comprises receiving JavaScript Object Notation ("JSON") formatted data back from the order database cache.

14. The computer program product of claim 11, wherein:
receiving the order lookup from the requesting computer system comprises receiving an order lookup request that is configured to change state at the order database;
determining the appropriate data source to service the order lookup based on the characteristics of the order lookup comprises determining that the order database is the appropriate data source to service the order lookup; and
routing the order lookup to the appropriate data source comprises routing the order lookup to the order database.

15. A system, the system comprising:
one or more processors;
non-transitory system memory;
an order database for a retailer, the order database comprising order data for a plurality of customer orders;
an order database cache, the order database cache comprising the order data synchronized from the order database; and
one or more computer storage devices having stored thereon computer-executable instructions representing a business layer, the business layer configured to:
  synchronize the order data from the order database to the order database cache by converting the order data from a relational database management system to a format based on attribute-value pairs;
  receive an order lookup from a requesting computer system, the order lookup indicating a database command type and indicating a portion of the order data associated with a customer order of the plurality of customer orders;
  determine an appropriate data source to service the order lookup based on characteristics of the order lookup, the characteristics comprising the database command type indicated and the portion of the order data indicated, the appropriate data source selected from among the order database and the order database cache;
  route the order lookup to the appropriate data source in response to the determination;
  receive the portion of the order data indicated back from the appropriate data source, the portion of the order data indicated responsive to the order lookup from the requesting computer system; and
  return the portion of the order data indicated to the requesting computer system.

16. The system of claim 15, wherein:
the business layer configured to receive the order lookup from the requesting computer system comprises configuring the business layer to receive the order lookup requesting a list of customer order numbers;
the business layer configured to determine the appropriate data source to service the order lookup comprises configuring the business layer to determine that the order lookup is to be routed to the order database cache; and
the business layer configured to route the order lookup to the appropriate data source comprises configuring the business layer to route the order lookup to the order database cache.

17. The system of claim 16, wherein:
the business layer configured to receive the portion of the order data indicated back from the appropriate data source comprises configuring the business layer to receive the list of customer order numbers back from the order database cache; and
the business layer configured to return the portion of the order data indicated to the requesting computer system comprises configuring the business layer to return the list of customer order numbers to the requesting computer system.

18. The system of claim 17, wherein:
the business layer is further configured to receive an other order lookup from the requesting computer system, the other order lookup requesting additional order detail for a customer order of the plurality of customer orders, the customer order identified by a customer order number included in the list of customer order numbers.

19. The system of claim 18, wherein:
the business layer is further configured to:
  determine that the order database is the appropriate data source to service the other order lookup based on configuring the other order lookup to change state at the order database; and
  route the other order lookup to the order database.

20. The method of claim 1, wherein:
receiving the order lookup from the requesting computer system comprises receiving an order lookup request that is configured to not change state at the order database;
determining the appropriate data source to service the order lookup based on the characteristics of the order lookup comprises determining that the order database cache is the appropriate data source to service the order lookup;
routing the order lookup to the appropriate data source comprises routing the order lookup to the order database cache;
receiving the portion of the order data indicated back from the appropriate data source comprises receiving back a list of order numbers;
returning the portion of the order data indicated to the requesting computer system comprises returning the list of order numbers to the requesting computer system; and
the method further comprises:
  receiving an other order lookup from the requesting computer system, the other order lookup requesting additional order detail for an order of the plurality of customer orders, the order of the plurality of customer orders corresponding to an order number in the list of order numbers; and
  the processor determining another appropriate data source to service the other order lookup based on characteristics of the other order lookup.

* * * * *